US008695150B1

(12) United States Patent
Cooper

(10) Patent No.: US 8,695,150 B1
(45) Date of Patent: Apr. 15, 2014

(54) TABLET COMPUTER CLEANING DEVICE

(76) Inventor: Christopher Cooper, Northridge, CA (US)

( * ) Notice: Subject to any disclaimer, the term of this patent is extended or adjusted under 35 U.S.C. 154(b) by 237 days.

(21) Appl. No.: 13/068,579

(22) Filed: May 16, 2011

(51) Int. Cl.
*A47L 25/00* (2006.01)

(52) U.S. Cl.
USPC .......................................... 15/210.1; 15/209.1

(58) Field of Classification Search
CPC .............. H04M 1/17; G06F 9/00; B05C 1/06; B05C 17/00
USPC ................. 15/209.1, 210.1, 228, 247; D19/34
See application file for complete search history.

(56) References Cited

U.S. PATENT DOCUMENTS

| | | | | |
|---|---|---|---|---|
| 2,500,841 A | * | 3/1950 | Fellman et al. ................ | 15/231 |
| 3,898,951 A | * | 8/1975 | Clare ............................. | 116/239 |
| 4,162,800 A | * | 7/1979 | Gonot et al. .................... | 281/42 |
| 4,961,596 A | * | 10/1990 | Moor ........................... | 281/15.1 |
| 5,054,816 A | * | 10/1991 | Rosengarten ................... | 281/42 |
| D346,399 S | * | 4/1994 | Schad et al. ................... | D19/34 |
| D449,648 S | * | 10/2001 | Andler .......................... | D19/34 |
| D457,561 S | * | 5/2002 | Salz et al. ..................... | D19/34 |
| 6,446,803 B1 | * | 9/2002 | McKinney .................... | 206/371 |
| 6,641,172 B1 | * | 11/2003 | Olson ............................ | 281/42 |
| 7,562,636 B2 | * | 7/2009 | Regala .......................... | 116/239 |
| D604,764 S | * | 11/2009 | Velonis ......................... | D19/34 |
| 2005/0022843 A1 | * | 2/2005 | Policicchio et al. .............. | 134/6 |
| 2010/0243515 A1 | * | 9/2010 | Mish et al. .................... | 206/701 |
| 2011/0210020 A1 | * | 9/2011 | Jones ............................. | 206/216 |
| 2012/0066865 A1 | * | 3/2012 | Lauder et al. ................... | 16/382 |
| 2012/0260611 A1 | * | 10/2012 | Jones ............................. | 53/468 |
| 2013/0042879 A1 | * | 2/2013 | Orr ............................... | 132/200 |
| 2013/0048520 A1 | * | 2/2013 | Garrett et al. ................. | 206/320 |

FOREIGN PATENT DOCUMENTS

| | | | | |
|---|---|---|---|---|
| JP | 2004364066 A | * | 12/2004 | ............. H04M 1/17 |
| JP | 2008113320 A | * | 5/2008 | |

OTHER PUBLICATIONS

Machine Translation of JP 2004364066 A—"JP2004364066A Machine Translation.PDF".*

* cited by examiner

*Primary Examiner* — Joseph J Hail
*Assistant Examiner* — Marc Carlson
(74) *Attorney, Agent, or Firm* — Albert O. Cota

(57) ABSTRACT

A tablet computer cleaning device (10) (TCCD 10) that is used to clean the screen of a tablet computer (80), an electronic reader (88) or the like. The TCCD (10) is particularly designed to be placed over and around the cover (82) of a tablet computer (80) when not being used to clean the screen (86) of the computer. The TCCD (10) is comprised of a resilient circular band (12) that has an outer fabric (14) and an inner fabric (32), wherein both of the fabrics function as particle-attracting fabrics. The structural integrity of the TCCD (10) is reinforced by including a border stitch (72) and to further enhance the utility of the invention, the TCCD (10) can include indicia (70) consisting of images of various forms.

10 Claims, 3 Drawing Sheets

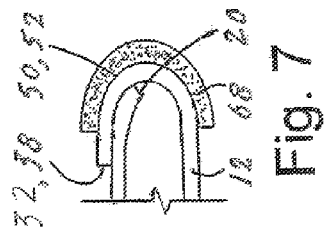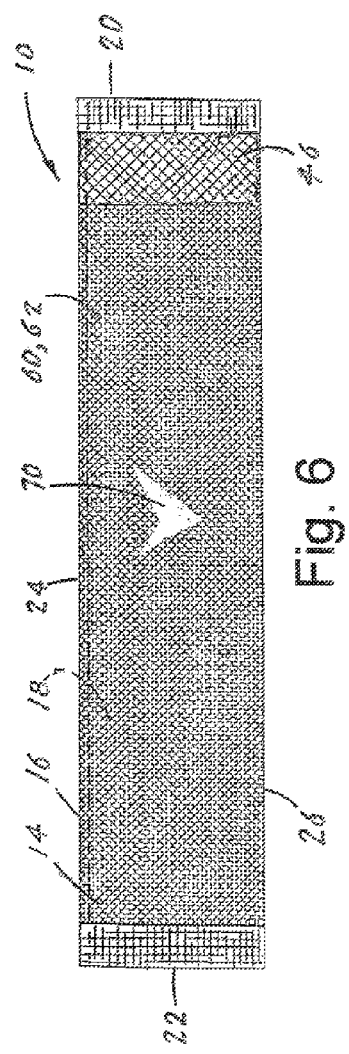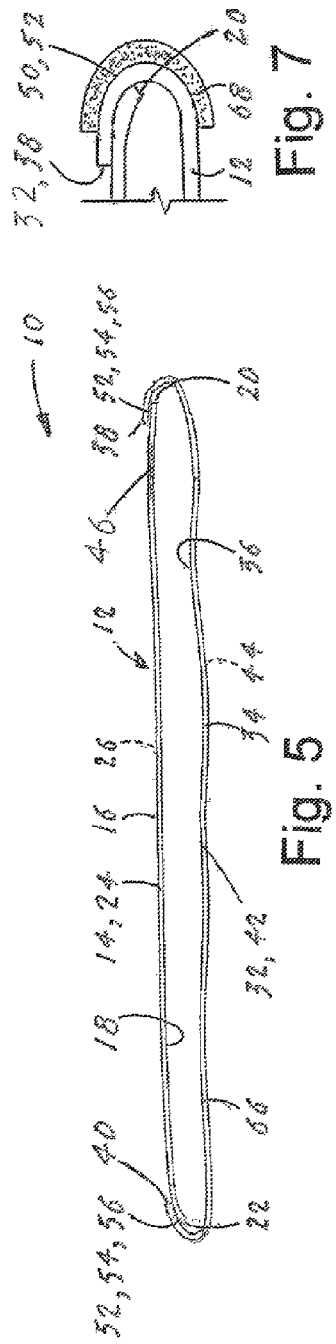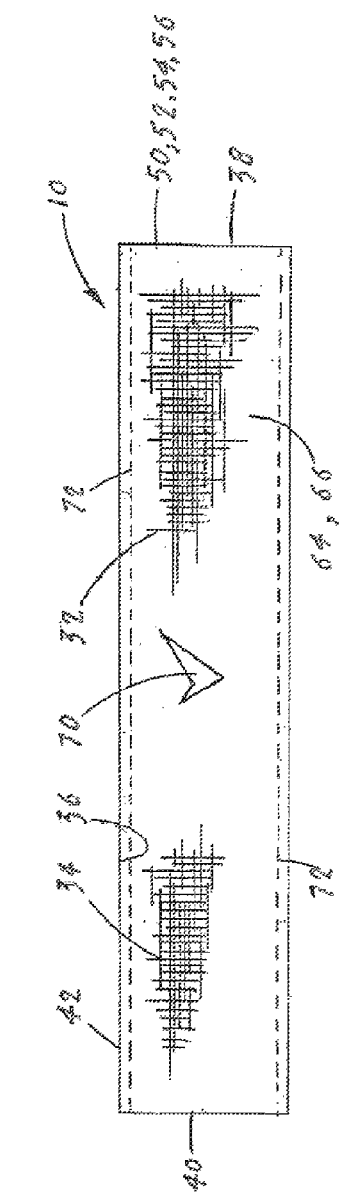

TABLET COMPUTER CLEANING DEVICE

TECHNICAL FIELD

The invention generally pertains to devices for cleaning the screen of tablet computers and the like. More particularly, the invention pertains to a circular band having two cleaning surfaces that are utilized to remove particles and smudges that have accumulated on the computer's screen. When not in use the circular band is placed over and around the cover of the tablet computer.

BACKGROUND ART

The use of tablet computers, such as the Apple iPAD™, have become common throughout the world in both industrialized and emerging countries. One problem inherent to computers is that due to static electricity their screens collect various airborne particles. Additionally, the screens are also subjected to the accumulation of smudges such as finger prints and the like.

The instant invention aids in solving the above problem by providing a tablet computer cleaning device (TCCD) that consists of a circular band that is inserted over and around a computer cover when not in use and that is easily removed from the computer cover for use. The TCCD has a pair of cleaning surfaces that are used to remove the particles and the finger prints that have become attached to the screen of the computer.

A prior art search did not disclose any patents or industry literature that read on the claims of the instant patent application.

DISCLOSURE OF THE INVENTION

The tablet computer cleaning device (TCCD), which is also known by its trademark iSLIP™, is designed to provide a user of a tablet computer, such as the Apple iPAD®, to have a TCCD that is conveniently stowed on a tablet computer cover when not in use, and that is easily removed from the cover to clean the screen of the computer. For brevity, the TCCD is disclosed with reference to a tablet computer. However, the TCCD can also be utilized to clean the screen of various models of electronic readers and the like.

In its basic design configuration, the TCCD is comprised of a resilient circular band that has an outer particle-attracting fabric and an inner particle-attracting fabric. The outer fabric is preferably comprised of a microfiber that is sold by the 3-M Company. The inner fabric is comprised of a resilient material such as SPANDEX® which functions as a cleaning surface as well as having resilient properties that allows the TCCD to be easily placed over and held around the computer cover when not in use. The band can be placed over and around the cover with either the outer fabric or the inner fabric interfacing with the computer screen. The TCCD is easily removed from the cover when the TCCD is to be used to clean the computer's screen. Additionally, for those computers that do not have a cover, the TCCD can be utilized by placing the TCCD over and around the body of the computer.

The resilient circular band includes an outer fabric, an inner fabric, a first end and a second end. The outer and inner fabrics are attached by means of a stitch, an adhesive, a hook and loop fastener or by a heat weld. The upper and lower side edges are attached by means of a border stitch that preferably consists of a double stitch pattern. Additionally, the outer surface of both the outer and inner surfaces of the band can include indicia of various types.

In view of the above disclosure, the primary object of the invention is to provide a TCCD that comprises a resilient circular band that is stowed on the cover of a tablet computer when the band is not being used to clean the screen of the tablet computer. To clean the computer's screen, the band can be easily removed from the computer cover.

In addition to the primary object of the invention it is also an object of the invention to provide a TCCD that:
 can be made in various widths and lengths to accommodate various sizes of tablet computers,
 is easy to install and remove,
 can include various indicia,
 can be sold as an aftermarket accessory or as an OEM element,
 can be washed,
 can be made of various particle-attracting materials,
 does not effect the functioning of the tablet computer, and
 is cost effective for both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a side elevational view showing an inner fabric of a resilient circular band that comprises the TCDD.

FIG. 5 is a top plan view of the resilient circular band.

FIG. 6 is a side elevational view showing an outer fabric of the resilient circular band.

FIG. 7 is a partial top plan view showing a U-section inserted and attached over and around the ends of the resilient circular band.

BEST MODE FOR CARRYING OUT THE INVENTION

Figure 1:
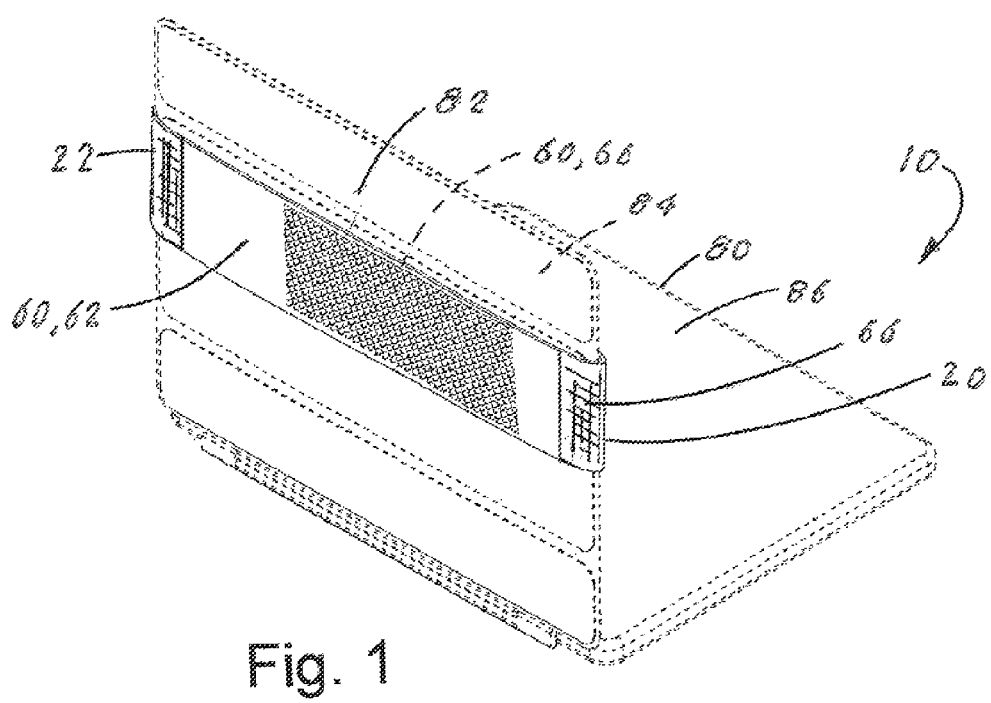
FIG. 1 is a rear orthographic view of a tablet computer cleaning device (TCCD) inserted over and around the cover of the tablet computer.

The best mode for carrying out the invention is presented in terms that disclose a preferred embodiment of a tablet computer cleaning device 10 (TCCD 10) which functions in combination with a tablet computer 80 that includes a computer cover 82 having an inner section 84 that protects the computer's screen 86 when the cover 82 is closed. The cover 82 can be comprised of a single flat section, or can be comprised of a plurality of articulated flat sections. The tablet computer 80 and its associated elements 82, 84 and 86 are shown in broken lines for illustrative purposes only and form no part of the claimed invention.

Figure 2:
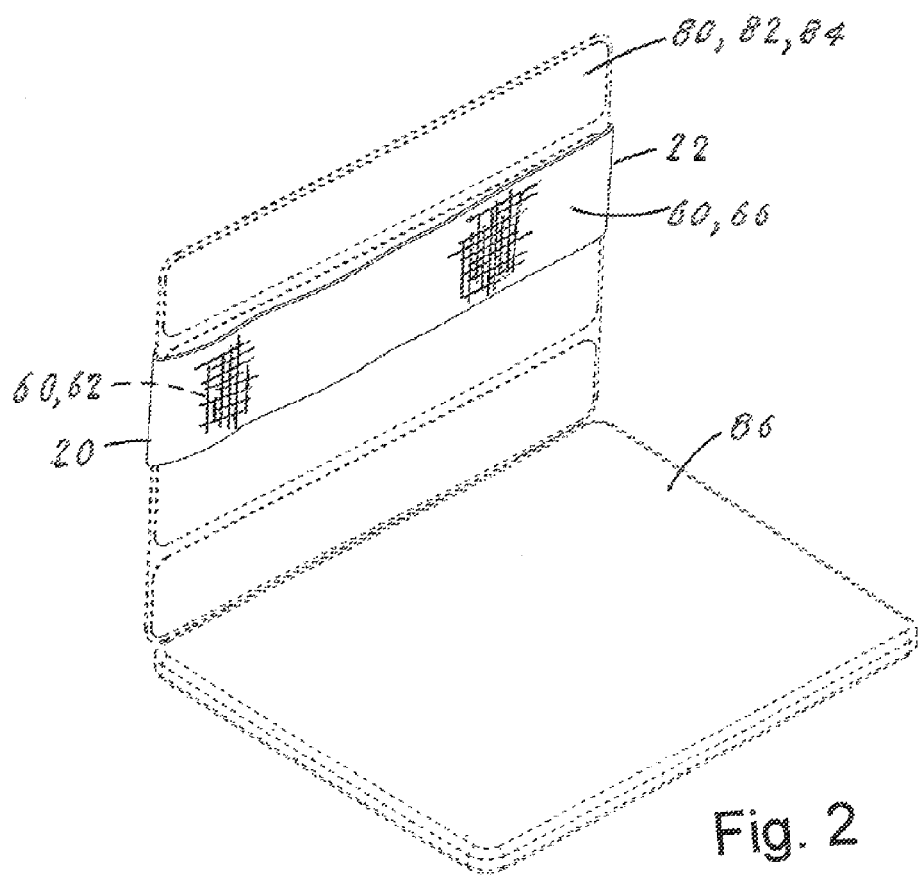
FIG. 2 is a front orthographic view of a TCCD inserted over and around the cover of the tablet computer.
Figure 3:
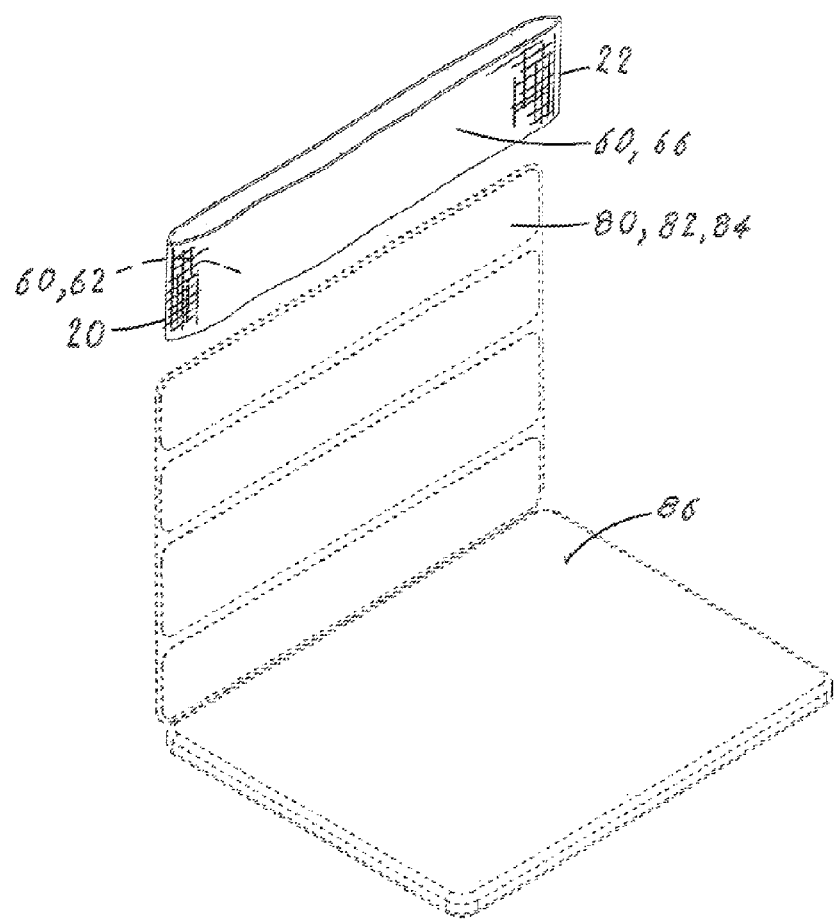
FIG. 3 is a front orthographic view showing a TCDD prior to being inserted over and around the cover of the tablet computer.

The preferred embodiment of the TCCD 10, as shown in FIGS. 1-7, is comprised of a resilient circular band 12 that is dimensioned to be placed over and around an electronic reader (not shown) or over and around the cover 82 of the computer tablet 80. The TCCD 10 is shown with the band 12 inserted into a cover 82 in FIGS. 1 and 2, and prior to being inserted into a cover 82 in FIG. 3.

The resilient circular band 12 is comprised of an outer fabric 14 and an inner fabric 32, as shown in FIGS. 4-6. The outer fabric 14 has an outer surface 16, an inner surface 18, a first end 20, a second end 22, an upper side edge 24, and a lower side edge 26. The inner fabric 32 has an outer surface 34, an inner surface 36, a first end 38, a second end 40, an upper side edge 42, and a lower side edge 44.

The inner fabric 32 is comprised of a resilient fabric 64 which is a woven synthetic fiber of a polyurethane-polyurea copolymer with at least 85 percent polyurethane by weight having alternating rigid and flexible segments displaying desired stretch characteristics that is preferably sold under the name SPANDEX® 66 by the DuPont Company et al. and which also functions as a cleaning surface. The outer fabric 14 is comprised of a particle attracting fabric 60 which is a woven synthetic fiber of polyester, polyamide, conjugation of polyester polyamide or polypropylene, with the synthetic fiber finer than 0.01 denier, preferably a MICROFIBER® 62 which is sold by the 3-M Company et al. To increase the elasticity of the outer fabric 14, an elastic strip 46, as shown in FIG. 6, can be stitched adjacent to the first end 20 and or the second end 22.

The width of the outer fabric 14 is substantially equal to the width of the inner fabric 32 and can range from 1.0 inch (2.54 cm) to 3.0 inches (7.62 cm), with a preferable width of 2.0 inches (5.08 cm). The length of the outer and inner fabrics when in a non-stretched configuration, can range from 6.0 inches (15.24 cm) to 10.0 inches (25.4 cm), with a preferable length of 9.0 inches (22.86 cm).

The first end 20 of the outer fabric 14 is attached by the attachment means 50 to the second end 40 of the inner fabric 32. The means 50 for attaching the first end 20 of the outer fabric 14 to the first end 38 of the inner fabric 32, and the second end 22 of the outer fabric 14 to the second end 40 of the inner fabric 32, is comprised of a stitching process 52, a contact adhesive 56, a heat weld 54 or a hook and loop fasteners 58. Additionally, the stitched first ends 20,38 can also include a U-section 68, as shown in FIG. 7, that overlaps the first and second ends of the band 12. The U-section 68, which adds a finished look to the band 12, is preferably attached by means of a heat weld 54 and/or a contact adhesive 56.

Additionally, to further enhance the aesthetics of the band 12, the upper and lower side edges 24,26 and 42,44 can have a single or double border stitch 72, as shown in FIG. 4. The border stitch provides a "finished look" to the TCCD 10 and also aids in maintaining the structural integrity of the TCCD 10.

To further extend the utility of the TCCD 10, indicia 70, as shown in FIGS. 4 and 6, can be applied to the outer surface 16 of the outer fabric 14 and/or to the outer surface 34 of the inner fabric 32. The indicia 70 can include but is not limited to a pattern, an image, a logo, a single color or a color combination.

To use the TCCD 10 the band 12 is removed from the cover 82. If the cover 82 is segmented, as shown in the figures, the cover 82 with the band 12 attached, is folded and used to grip and traverse the band 12 over the computer screen 86.

Lastly, to enhance the versatility of the TCCD 10, the inner fabric 32 which normally interfaces with the inner section of the computer cover 82 can be reversed so that the outer fabric 14 interfaces with the inner section of the computer cover 82.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

Tablet Computer Cleaning Device

Element Designation

| | |
|---|---|
| 10 | Tablet Computer Cleaning Device (TCCD) |
| 12 | Resilient Circular Band |
| 14 | Outer Fabric |
| 16 | Outer Surface |
| 18 | Inner Surface |
| 20 | First End |
| 22 | Second End |
| 24 | Upper Side Edge |
| 26 | Lower Side Edge |
| 28 | |
| 30 | |
| 32 | Inner Fabric |
| 34 | Outer Surface |
| 36 | Inner Surface |
| 38 | First End |
| 40 | Second End |
| 42 | Upper Side Edge |
| 44 | Lower Side Edge |
| 46 | Elastic Strip |
| 48 | |
| 50 | Attachment Means |
| 52 | Stitching Processing |
| 54 | Heat Weld |
| 56 | Contact Adhesive |
| 58 | Hook and Loop Fasteners |
| 60 | Particle Attracting Fabric |
| 62 | MICROFIBER ® |
| 64 | Resilient Fabric |
| 66 | SPANDEX ® |
| 68 | U-Section |
| 70 | Indicia |
| 72 | Border Stitch |
| 74 | |
| 76 | |
| 78 | |
| 80 | Tablet Computer |
| 82 | Articulated Computer Cover |
| 84 | Inner Section |
| 86 | Computer Screen |
| 88 | Electronic Reader |

The invention claimed is:

1. A tablet computer cleaning device (TCCD) that functions in combination with a tablet computer that has attached a computer cover that protects the screen of the computer when the computer cover is closed, wherein said TCCD comprises a resilient circular band dimensioned to be placed over and around the cover of the computer tablet or when the TCCD is to be used the band is removed from the computer cover, wherein said band comprises:

a) an elongated outer fabric having:
(1) an outer surface,
(2) an inner surface,
(3) a first longitudinal end,
(4) a second longitudinal end,
(5) an upper side edge with stitched hem,
(6) a lower side edge with stitched hem, and
wherein said outer fabric is a particle-attracting fabric comprised of a microfiber which is a woven synthetic fiber selected from the group consisting of polyester, polyamide, conjugation of polyester polyamide and polypropylene having the synthetic fiber finer than 0.01 denier, and b) an elongated inner fabric having:
   (1) an outer surface,
   (2) an inner surface,
   (3) a first longitudinal end,
   (4) a second longitudinal end,
   (5) an upper side edge with stitched hem,
   (6) a lower side edge with stitched hem, and
   wherein the first longitudinal end of said outer fabric is attached by an attachment means to the first longitudinal end of said inner fabric, and the second longitudinal end of said outer fabric is attached by the attachment means to the second longitudinal end of said inner fabric longitudinally opposite to the first longitudinal ends, and
c) a U-section that overlaps both attached first and second longitudinal ends of said band and is attached by means of a contact adhesive and/or a heat weld, and
d) said TCCD can be made in various widths and lengths to accommodate various sizes of tablet computers and electronic readers.

2. The TCCD as specified in claim 1 further comprising an elastic strip that is stitched adjacent to the first end and/or the second end of said outer fabric.

3. The TCCD as specified in claim 1 wherein said inner fabric is comprised of a resilient fabric.

4. The TCCD as specified in claim 3 wherein said resilient fabric is a woven synthetic fiber of a polyurethane-polyurea copolymer with at least 85 percent polyurethane by weight having alternating rigid and flexible segments displaying stretch characteristics.

5. The TCCD as specified in claim 1 wherein the width of said outer fabric is substantially equal to the width of said inner fabric.

6. The TCCD as specified in claim 1 wherein the means for attaching the first and second ends of said outer and inner fabric comprises a stitching process.

7. The TCCD as specified in claim 1 wherein the means for attaching the first and second ends of said outer and inner fabric comprises a stitching process, a heat weld, or a Contact adhesive.

8. The TCCD as specified in claim 1 wherein the width of said band ranges from 1.0 inch (2.54 cm) to 3.0 inches (7.62 cm).

9. The TCCD as specified in claim 1 wherein the length of said band when in a non-stretched configuration, ranges from 6.0 inches (15.24 cm) to 10.0 inches (25.4 cm).

10. The TCCD as specified in claim 1 wherein the inner fabric, which normally interfaces with the inner section of the computer cover, can be reversed so that the outer fabric interfaces with the inner section of the computer cover.

* * * * *